United States Patent
Aquila et al.

(10) Patent No.: US 12,109,962 B2
(45) Date of Patent: Oct. 8, 2024

(54) RECONFIGURABLE VEHICLE BUMPER ENDS

(71) Applicant: Canoo Technologies Inc., Torrance, CA (US)

(72) Inventors: Anthony Aquila, Justin, TX (US); Richard Kim, Los Angeles, CA (US); Arthur Henrique Martins Junior, Los Angeles, CA (US); Jackson Eric Luttig, Rancho Palos Verdes, CA (US); Senon Franco, Torrance, CA (US); Mark Smith, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 142 days.

(21) Appl. No.: 17/804,034

(22) Filed: May 25, 2022

(65) Prior Publication Data

US 2023/0382335 A1     Nov. 30, 2023

(51) Int. Cl.
*B60R 19/48*     (2006.01)
*B60R 19/50*     (2006.01)

(52) U.S. Cl.
CPC .............. *B60R 19/48* (2013.01); *B60R 19/50* (2013.01); *B60R 2019/505* (2013.01)

(58) Field of Classification Search
CPC ......... B60R 3/007; B60R 19/48; B60R 19/50; B60R 2019/505
See application file for complete search history.

(56) References Cited

U.S. PATENT DOCUMENTS

| | | | | |
|---|---|---|---|---|
| 5,538,265 A * | 7/1996 | Chen | ......................... | B60R 3/02 280/166 |
| 6,203,078 B1 * | 3/2001 | Karrer | ....................... | B60P 7/15 293/146 |
| 6,491,315 B2 * | 12/2002 | Hagen | .................. | B60Q 1/2661 280/169 |
| 7,377,563 B1 * | 5/2008 | Demick | .................. | B60R 19/48 280/166 |
| 7,390,003 B1 * | 6/2008 | Sylvia | ..................... | B60R 3/007 280/166 |
| 7,416,232 B2 * | 8/2008 | Tier | .......................... | B60R 3/00 280/163 |
| 7,604,267 B2 * | 10/2009 | Rock | ....................... | B60R 19/02 280/164.1 |
| 8,505,990 B2 * | 8/2013 | Czopek | .................... | B60R 19/18 293/133 |
| 9,434,317 B2 * | 9/2016 | Nania | ........................ | B60R 3/02 |
| 9,487,170 B2 * | 11/2016 | Evans | ....................... | B60R 19/44 |
| 10,464,491 B1 * | 11/2019 | Masanek, Jr. | ............ | B60D 1/58 |
| 10,703,314 B1 * | 7/2020 | Bundy | ........................ | B60R 3/00 |
| 10,967,801 B2 * | 4/2021 | Kaddouh | ................ | B62D 33/02 |
| 11,254,374 B2 * | 2/2022 | Diehl | ..................... | B62D 35/005 |

(Continued)

FOREIGN PATENT DOCUMENTS

DE     102008062056 A1 *   6/2010   ............. B60R 3/007

*Primary Examiner* — Jason S Morrow

(57) ABSTRACT

A multi-purpose vehicle includes reconfigurable bumper ends each including a vehicle bumper end body configured to securely attach to a vehicle bumper and extend along a side of a vehicle on which the vehicle bumper is mounted. A socket formed within the vehicle bumper end body is configured to receive an insert portion of a bumper end insert. Bumper end inserts may include a step insert or a safety indicator insert.

20 Claims, 4 Drawing Sheets

(56) References Cited

U.S. PATENT DOCUMENTS

| | | | |
|---|---|---|---|
| 11,578,854 B1* | 2/2023 | Grall | B32B 33/00 |
| 11,584,319 B2* | 2/2023 | Luo | B60R 19/48 |
| 11,597,323 B1* | 3/2023 | Wingo | B60R 19/48 |
| 2002/0117525 A1* | 8/2002 | Ahola | B60R 9/06 |
| | | | 224/518 |
| 2009/0267385 A1* | 10/2009 | Shackleford | B60R 3/007 |
| | | | 248/219.3 |
| 2014/0339837 A1* | 11/2014 | Hermann, III | B66D 1/00 |
| | | | 293/133 |
| 2017/0298675 A1* | 10/2017 | Dimig | B60R 3/02 |
| 2018/0222375 A1* | 8/2018 | Tyler | A47C 17/80 |
| 2018/0257592 A1* | 9/2018 | Miranda Nieto | B60R 13/01 |
| 2021/0129758 A1* | 5/2021 | Wymore | B60D 1/52 |
| 2022/0111796 A1* | 4/2022 | Klein | B60D 1/58 |
| 2022/0332254 A1* | 10/2022 | Smith | B60R 3/02 |
| 2022/0348141 A1* | 11/2022 | Luo | B60R 19/48 |
| 2023/0003874 A1* | 1/2023 | Yu | G01S 7/027 |
| 2023/0373398 A1* | 11/2023 | Bird | B60R 19/48 |

* cited by examiner

RECONFIGURABLE VEHICLE BUMPER ENDS

TECHNICAL FIELD

This disclosure relates generally to vehicles. More specifically, this disclosure relates to reconfigurable bumper ends for a multi-purpose vehicle.

BACKGROUND

Automobiles, or vehicles, typically include safety equipment colloquially referred to as "bumpers" at the front and rear, to absorb most of the impact during low speed collisions and help protect the operator/passenger(s) and the vehicle from more serious damage. Various bumper configurations are known, including flush or substantially flush bumpers. Bumpers often wrap around front corners of the vehicle Traditionally, bumper ends have not included any meaningful functionality beyond, in some designs, serving as a fixed mounting location for headlights and/or side turn signal lights.

SUMMARY

This disclosure relates to a multi-purpose vehicle with reconfigurable bumper ends.

In certain embodiments, a reconfigurable vehicle bumper end includes a vehicle bumper end body configured to securely attach to a vehicle bumper and extend along a side of a vehicle on which the vehicle bumper is mounted. A socket formed within the vehicle bumper end body is configured to receive an insert portion of a bumper end insert.

In certain embodiments, a method of reconfiguring a vehicle bumper end includes configuring a vehicle bumper end body to securely attach to a vehicle bumper and extend along a side of a vehicle on which the vehicle bumper is mounted. A socket provided within the vehicle bumper end body is configured to receive an insert portion of a bumper end insert.

In some embodiments, the reconfigurable vehicle bumper end is configured to wrap around a corner of the vehicle.

In some embodiments, the socket includes one or more structures for retaining the insert portion of the bumper end insert, once received therein.

In some embodiments, the reconfigurable vehicle bumper end also includes a step insert having a panel movable between a closed position and an open position, the panel forming a step surface when the panel is in the open position.

In some embodiments, the step insert is configured to support at least 250 pounds when the panel is in the open position.

In some embodiments, an upper surface of the panel, when the panel is in the open position, has a textured surface.

In some embodiments, an upper surface of the panel, when the panel is in the open position, is approximately 12 inches above the ground on which the vehicle rests.

In some embodiments, the reconfigurable vehicle bumper end includes a safety indicator insert having a panel movable between a retracted position and a deployed position, the panel extending substantially perpendicularly to a body of the vehicle when in the deployed position.

In some embodiments, at least one major surface of the panel includes warning indicia.

In some embodiments, the warning indicia include one or more of stripes of alternating colors, lights, or reflectors.

In some embodiments, a vehicle including the reconfigurable vehicle bumper end includes a chassis to which the vehicle bumper is mounted, wheels mounted to the chassis, a motor mounted to the chassis, and a vehicle body mounted to the chassis, the vehicle body configured to accommodate at least an operator for the vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Figure 1:
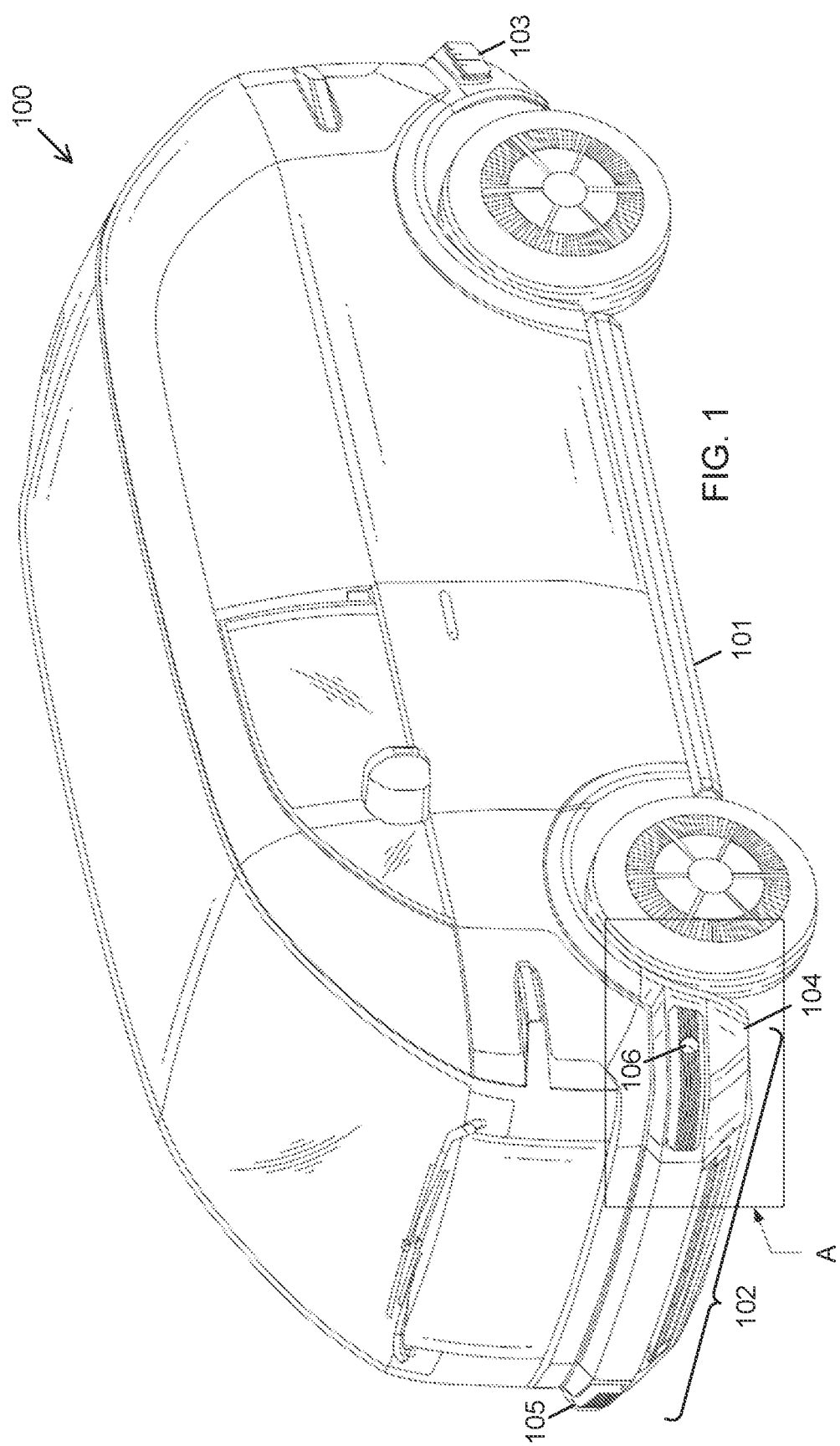
FIG. 1 illustrates an example multi-purpose vehicle with reconfigurable bumper ends according to embodiments of the present disclosure.

FIG. 1 illustrates an example multi-purpose vehicle with reconfigurable bumper ends according to embodiments of the present disclosure. The embodiment of the vehicle 100 illustrated in FIG. 1 is for illustration and explanation only. FIG. 1 does not limit the scope of this disclosure to any particular implementation of a vehicle.

In the example illustrated in FIG. 1, the vehicle 100 may include a top hat structure coupled to an electric vehicle platform, where the platform of vehicle 100 includes a chassis (not visible in FIG. 1) supporting a body 101 for carrying the operator, passengers and/or cargo. In some embodiments, the vehicle is an electric vehicle (EV) and the chassis of the vehicle 100 is in the form of a "skateboard" vehicle platform supporting one or more energy storage elements (such as batteries) that provide input electrical power used by various components of the EV, such as one or more electric motors of the electric vehicle 100 and a control system of the electric vehicle 100. The top hat structure is designed and dimensioned to have a crew cabin ("cab") and cargo space, such as a bed or enclosed cargo area. The cabin is configured to provide a space for one or more persons to sit and either operate or ride in the electric vehicle.

The operator and/or passengers may enter and exit the cabin through at least one door forming part of the cabin. A separate structure may permit access to the cargo storage, such as one or more sliding side door(s), a rear lift gate, a rear tailgate, or some combination of the same. A transparent windshield and other transparent panels mounted within and forming part of the cabin allow at least one passenger (referred to as the "operator," even when the vehicle 100 is operating in an advanced driving or "AD" mode) to see outside the cabin. Rear-view mirrors mounted to sides of the cabin enable the operator to see objects to the sides and rear of the cabin and may include warning indicators (such as selectively illuminated warning lights) for features such as blind spot warning (indicating that another vehicle is in the operator's blind spot) and/or lane departure warning.

The body 101 includes a front bumper 102 and a rear bumper 103, each mounted to the chassis in accordance with the known art. The bumpers 102, 103 may each be formed of any suitable material such as steel, aluminum, or other metal, and/or fiber-reinforced plastic, etc., and may be encased with a fascia of one or more various resin materials, such as, thermoplastic olefins (TPOs), polycarbonates, polyesters, polypropylene, polyurethanes and/or polyamides, and/or other materials with characteristics such as resiliency, flexibility and that resist deformation in response to low speed impact events. The bumpers 102, 103 may each include energy absorbing structures (a/k/a "crumple zones") designed to deform on impact by the vehicle 100 with another object and absorb shock.

As shown in FIG. 1, the bumpers 102, 103 each wrap around a corner of the vehicle body 101 and extend a short distance down a side of the body 101. Thus, the front bumper 102 includes ends 104, 105, and bumper 103 likewise includes similar ends. The structure(s) described herein for reconfigurable bumper ends may be implemented for any or all of the ends of the bumpers 102, 103. Alternatively, the reconfigurable bumper end structure(s) described herein may be implemented only for the front bumper 102 of a given vehicle design, or only for the rear bumper 103, or only for the driver's side bumper ends, or only for the passenger side bumper ends.

Figure 2:
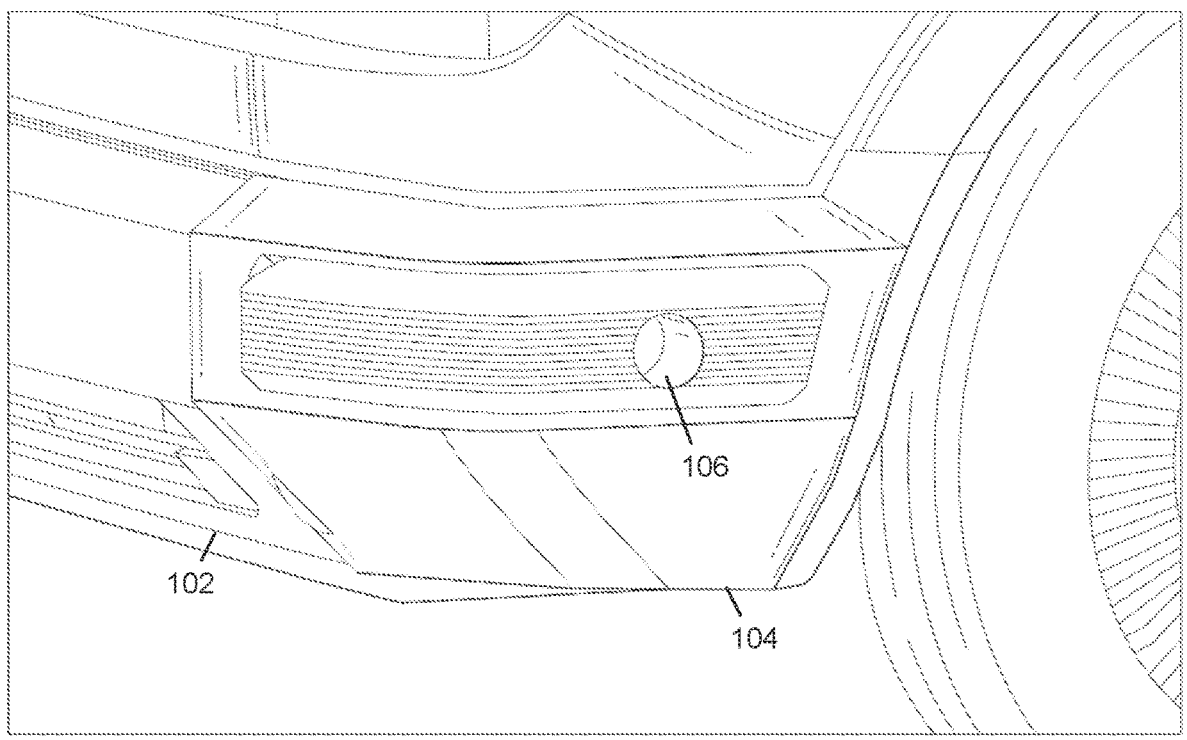
FIG. 2 is an enlarged view of one bumper end visible in FIG. 1.

FIG. 2 is an enlarged view of a portion of one bumper end visible in FIG. 1, depicting the portion in box A in greater detail. Front bumper 102 includes end 104 formed by a body wrapping around a corner of the vehicle 100. End 104 includes a socket 106 for receiving a portion of an insert. The socket 106 may be circular, elliptical, or oval in cross-section, or may have a generally square or rectangular cross-section with (preferably) rounded corners. The cross-sectional area of the socket 106, and the depth of the socket 106, are selected to support a wide range of inserts of the type described below. Sidewalls of the socket 106 may include features for retaining a received portion of an insert, such as one or more recesses for engaging spring-biased protrusions on the received insert portion or for receiving fixed protrusions when the received insert portion is rotated within the socket 106.

Figure 3:
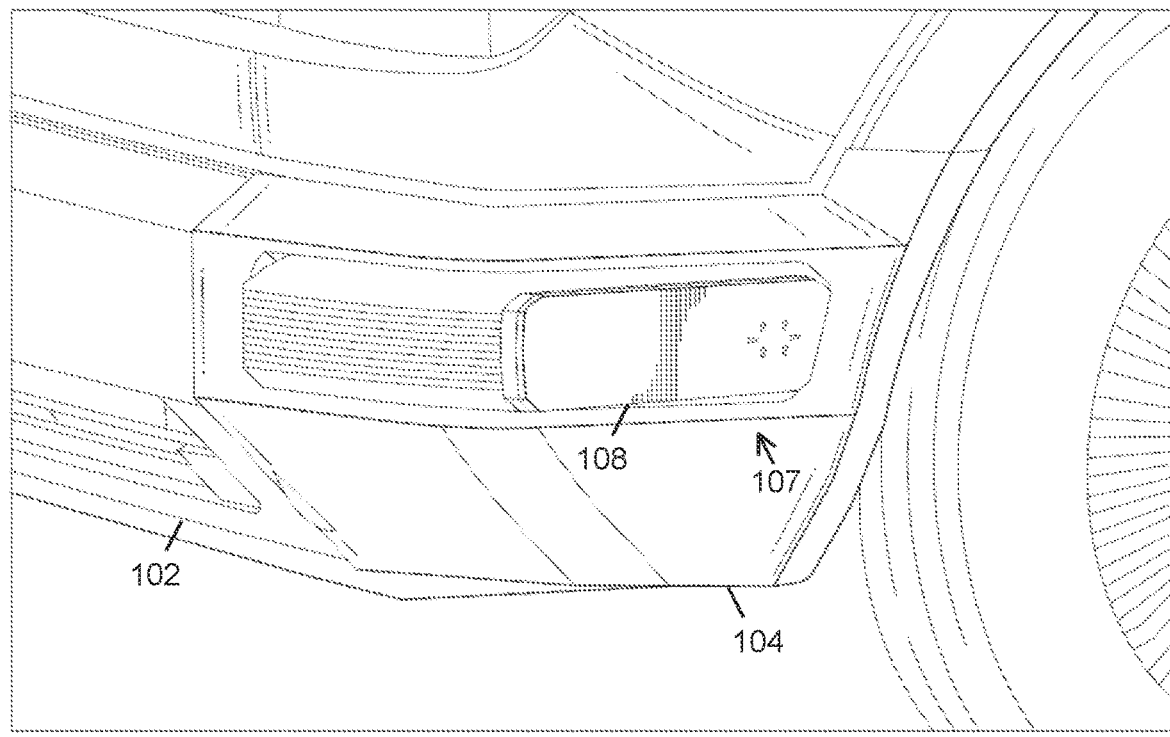
FIG. 3 is a view of a bumper end with a step insert, in a closed position, inserted into the socket.
Figure 4:
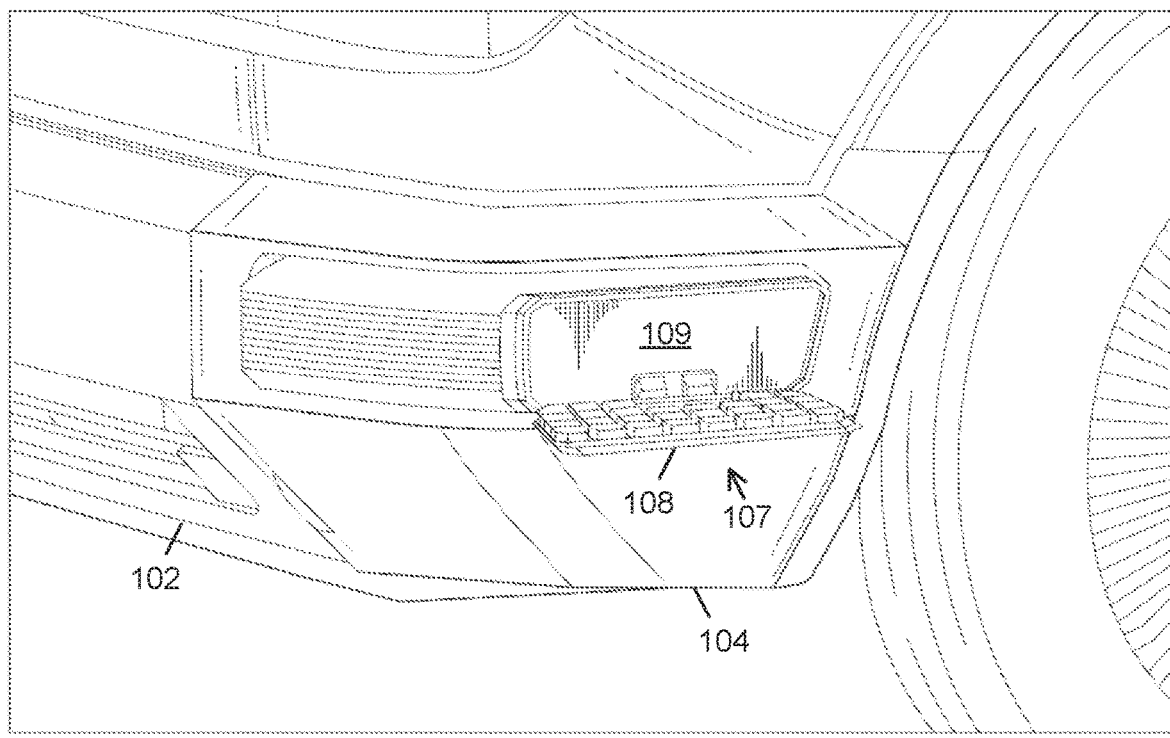
FIG. 4 is a view of a bumper end with a step insert, in an open position, inserted into the socket.

FIG. 3 is a view of the bumper end of FIG. 2 with a step insert, in a closed position, inserted into the socket. FIG. 4 is a view of the bumper end of FIG. 2 with the step insert, in an open position, inserted into the socket. The step insert 107 includes an outer panel 108 that is secured within a shallow receptacle 109 when in the closed position illustrated in FIG. 3. The outer panel 108 rotates around a bottom edge (e.g., on hinges or similar structures) to extend substantially horizontally outward when in the open position illustrated in FIG. 4. The outer panel 108 is sized to support a human foot on an upper surface thereof (the "inner" surface when the panel is closed) when in the open position, such as approximately 9 to 12 inches in length by approximately 5 to 9 inches in width. When in the open position, the outer panel 108 is preferably no more than approximately 12 to 18 inches above the ground. A textured surface may be provided on the upper surface of the outer panel 108 when in the open position, for improved traction. In the open position, the outer panel 108 and the portion of the step insert 107 received by the socket are preferably capable of supporting at least 250 pounds (lbs). The step insert 107, when open, provides a step for reaching upper portions of the vehicle 100 to (for example) clean upper portions of the windshield or add/remove items from a luggage rack on top of the vehicle 100.

As discussed above, the step insert 107 has a portion that may be retainably inserted into the bumper end socket 106. The insert portion may be an elongate cylinder with square or rectangular protrusions that are "keyed" or indexed to one or both of grooves and cutouts within sidewalls of the socket, so that the insert portion slides into the socket and, upon being rotated 90°, "snaps" into place. Alternatively, the insert portion may be elongate with an elliptical or oval cross-section, and movable, triangular protrusions received by cutouts in sidewalls of the socket upon insertion. Other mechanisms for securing the insert portion in place once inserted into the socket 106 may also be employed.

Figure 5:
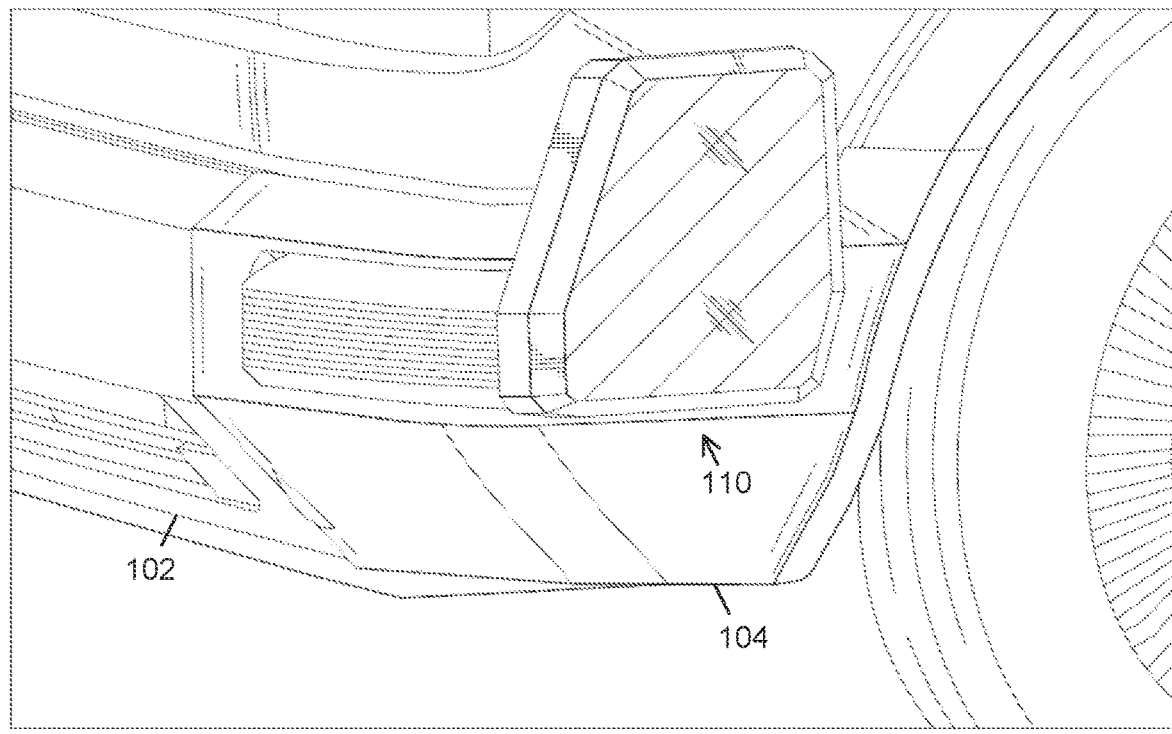
FIG. 5 is a view of a bumper end with a safety indicator insert, in a retracted position, inserted into the socket.
Figure 6:
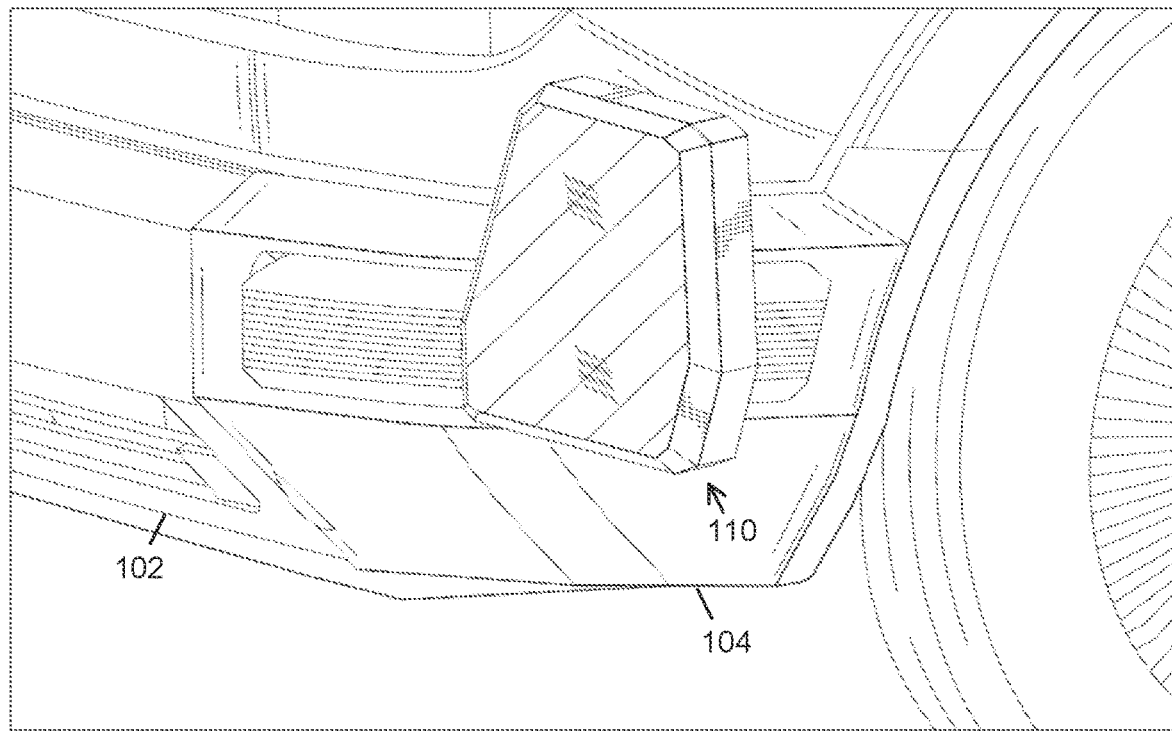
FIG. 6 is a view of a bumper end with a safety indicator, insert in a deployed position, inserted into the socket.

FIG. 5 is a view of the bumper end of FIG. 2 with a safety indicator insert 110, in a retracted position, inserted into the socket. FIG. 6 is a view of the bumper end of FIG. 2 with a safety indicator insert 110, in a deployed position, inserted into the socket. The safety indicator insert 110 includes a flat panel mounted to rotate about a lower, forward edge, to substantially align with the body of the vehicle 100 when in the retracted position and to extend substantially perpendicularly from the vehicle body when in the deployed position. The major surfaces of the safety indicator insert 110 may contain diagonal stripes of alternating colors (e.g., red and white), flashing lights (e.g., battery powered) or reflectors, and/or other warning indicia to signal passing motorist that (for example) the vehicle 100 is stopped, when the safety insert is deployed. The insert portion of the safety indicator insert 110 may include any of the structures described above for other embodiments.

While a step insert 107 and a safety indicator insert 110 are described above, the inserts that may be employed with the bumper end socket to reconfigure the vehicle bumper may take a variety of other forms and/or provide other functionality. For example, directional lights may be inserted into the socket. In some embodiments, towing connectors may be inserted into the bumper ends on both sides of the bumper, to facilitate towing of the vehicle, towing by the vehicle, or lifting an end of the vehicle on which the bumper in mounted. Similarly, a jack-connection insert may be inserted into the socket to elevate the corresponding corner of the vehicle with a mechanical or electromechanical jack. Other alternatives will be apparent to those skilled in the art, based on the foregoing description.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A reconfigurable vehicle bumper end, comprising:
    a vehicle bumper end body configured to securely attach to a vehicle bumper and extend along a side of a vehicle on which the vehicle bumper is mounted, the side of the vehicle extending from a front of the vehicle toward a rear of the vehicle; and
    a socket formed by a recess extending into an outside surface of the vehicle on a portion of the vehicle bumper end body that extends along the side of the vehicle, the recess extending inward, relative to the vehicle, from the outside surface of the vehicle on the portion of the vehicle bumper end body that extends along the side of the vehicle,
    wherein the socket is configured to receive an insert portion of a bumper end insert.

2. The reconfigurable vehicle bumper end according to claim 1, wherein the vehicle bumper end body is configured to wrap around a corner of the vehicle.

3. The reconfigurable vehicle bumper end according to claim 1, wherein the socket includes one or more structures for retaining the insert portion of the bumper end insert, once received therein.

4. The reconfigurable vehicle bumper end according to claim 1, further comprising:
    a step insert having a panel movable between a closed position and an open position, the panel forming a step surface when the panel is in the open position.

5. The reconfigurable vehicle bumper end according to claim 4, wherein the step insert is configured to support at least 250 pounds when the panel is in the open position.

6. The reconfigurable vehicle bumper end according to claim 4, wherein an upper surface of the panel, when the panel is in the open position, has a textured surface.

7. The reconfigurable vehicle bumper end according to claim 4, wherein an upper surface of the panel, when the panel is in the open position, is approximately 12 inches above the ground on which the vehicle rests.

8. The reconfigurable vehicle bumper end according to claim 1, further comprising:
    a safety indicator insert having a panel movable between a retracted position and a deployed position, the panel extending substantially perpendicularly to a body of the vehicle when in the deployed position.

9. The reconfigurable vehicle bumper end according to claim 8, wherein at least one major surface of the panel includes warning indicia, wherein the warning indicia include one or more of stripes of alternating colors, lights, or reflectors.

10. The vehicle including the reconfigurable vehicle bumper end according to claim 1, the vehicle further comprising:
    a chassis to which the vehicle bumper is mounted;
    wheels mounted to the chassis;
    a motor mounted to the chassis; and
    a vehicle body mounted to the chassis, the vehicle body configured to accommodate at least an operator for the vehicle.

11. A method of reconfiguring a vehicle bumper end, comprising:
    configuring a vehicle bumper end body to securely attach to a vehicle bumper and extend along a side of a vehicle on which the vehicle bumper is mounted, the side of the vehicle extending from a front of the vehicle toward a rear of the vehicle; and
    providing a socket formed by a recess extending into an outside surface of the vehicle on a portion of the vehicle bumper end body that extends along the side of the vehicle, the recess extending inward, relative to the vehicle, from the outside surface of the vehicle on the portion of the vehicle bumper end body that extends along the side of the vehicle,
    wherein the socket is configured to receive an insert portion of a bumper end insert.

12. The method according to claim 11, wherein the vehicle bumper end body is configured to wrap around a corner of the vehicle.

13. The method according to claim 11, wherein the socket includes one or more structures for retaining the insert portion of the bumper end insert, once received therein.

14. The method according to claim 11, further comprising:
    securing a step insert in the socket, the step insert having a panel movable between a closed position and an open position, the panel forming a step surface when the panel is in the open position.

15. The method according to claim 14, wherein the step insert is configured to support at least 250 pounds when the panel is in the open position.

16. The method according to claim 14, wherein an upper surface of the panel, when the panel is in the open position, has a textured surface.

17. The method according to claim 14, wherein an upper surface of the panel, when the panel is in the open position, is approximately 12 inches above the ground on which the vehicle rests.

18. The method according to claim 11, further comprising:
    securing a safety indicator insert in the socket, the safety indicator insert having a panel movable between a retracted position and a deployed position, the panel extending substantially perpendicularly to a body of the vehicle when in the deployed position.

19. The method according to claim 18, wherein at least one major surface of the panel includes warning indicia.

20. The method according to claim 19, wherein the warning indicia include one or more of stripes of alternating colors, lights, or reflectors.

\* \* \* \* \*